(12) United States Patent
Tamizkar (10) Patent No.: US 10,715,431 B2
(45) Date of Patent: Jul. 14, 2020

(54) METHODS AND APPARATUSES FOR ROUTING DATA PACKETS IN A NETWORK TOPOLOGY

(71) Applicant: Telia Company AB, Solna (SE)

(72) Inventor: Babak Tamizkar, Stockholm (SE)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/173,811

(22) Filed: Oct. 29, 2018

(65) Prior Publication Data

US 2019/0132243 A1 May 2, 2019

(30) Foreign Application Priority Data

Oct. 31, 2017 (SE) ...................................... 1751344

(51) Int. Cl.
| | |
|---|---|
| *G06F 15/173* | (2006.01) |
| *H04L 12/713* | (2013.01) |
| *H04L 12/46* | (2006.01) |
| *H04L 12/715* | (2013.01) |
| *H04L 12/723* | (2013.01) |
| *H04L 12/741* | (2013.01) |

(52) U.S. Cl.
CPC ........ *H04L 45/586* (2013.01); *H04L 12/4641* (2013.01); *H04L 45/04* (2013.01); *H04L 45/50* (2013.01); *H04L 45/745* (2013.01)

(58) Field of Classification Search
CPC ....... H04L 45/586; H04L 45/04; H04L 45/50; H04L 45/745; H04L 12/4641
USPC ................................................. 709/238, 224
See application file for complete search history.

(56) References Cited

U.S. PATENT DOCUMENTS

| 6,980,524 B1 | 12/2005 | Lu et al. |
| 10,057,162 B1 * | 8/2018 | Singh ...................... H04L 69/22 |
| 2001/0033556 A1 | 10/2001 | Krishnamurthy et al. |

(Continued)

FOREIGN PATENT DOCUMENTS

CN          1697396 A          11/2005

OTHER PUBLICATIONS

Swedish Search Report, App. No. 1751344-1, dated May 24, 2018, pp. 1-2; Swedish Patent and Registration Office, Stockholm, Sweden, Eddie Rmsili.

(Continued)

*Primary Examiner* — Philip B Tran
(74) *Attorney, Agent, or Firm* — Burr & Forman LLP; Jeffrey H. Kamenetsky (57) ABSTRACT

The embodiments herein relate to methods and routers. One method includes: receiving a data packet from a source host router connected to a source host, said packet comprising a source IP address of the source host and a destination IP address of a destination host, the data packet being received on an interface of the source edge router identified by a virtual private network identity, VRF-ID; extracting, from a configuration information on said interface, of the source edge router, a zone-identity, zone-ID, of a destination edge router to which a destination host router is associated, wherein the destination host router is connected to the destination host, adding the zone-ID and the VRF-ID at Layer 2.5 of the data packet; and sending the data packet towards the destination edge router having the assigned zone-ID.

8 Claims, 6 Drawing Sheets

(56) References Cited

U.S. PATENT DOCUMENTS

| | | | | |
|---|---|---|---|---|
| 2003/0067912 | A1* | 4/2003 | Mead | H04L 29/12018 370/389 |
| 2007/0280245 | A1* | 12/2007 | Rosberg | H04L 47/10 370/392 |
| 2009/0059914 | A1* | 3/2009 | Khalid | H04L 12/2854 370/389 |
| 2010/0135287 | A1* | 6/2010 | Hosain | H04L 47/10 370/389 |
| 2011/0305242 | A1* | 12/2011 | Miki | H04L 49/3009 370/392 |
| 2012/0039339 | A1* | 2/2012 | Kurita | H04L 45/00 370/400 |
| 2012/0239796 | A1* | 9/2012 | Narasappa | H04L 45/02 709/224 |
| 2013/0111036 | A1* | 5/2013 | Ozawa | H04L 41/0843 709/226 |
| 2013/0198825 | A1* | 8/2013 | Feytons | H04L 63/0876 726/6 |
| 2014/0207897 | A1* | 7/2014 | Kodama | H04L 45/745 709/213 |
| 2015/0281073 | A1* | 10/2015 | Kotha | H04L 45/745 370/392 |
| 2017/0289032 | A1 | 10/2017 | Guichard et al. | |
| 2018/0152346 | A1* | 5/2018 | Tanabe | H04L 41/042 |

OTHER PUBLICATIONS

Radia Perlman, Intel Labs, Bhargav Bhikkaji, Balaji Venkat Venkataswami, Ramasubramani Mahadevan, Shivakumar Sundaram, Narayana Perumal Swamy, Dell, Feb. 19, 2013, "Connecting Disparate TRILL-based Data Center/PBB/Campus sites using BGP draft-balaji-12vpn-trill-over-ip-multi-level-03" TXT, Internet Engineering Task Force, IETF; Standardworkingdraft, Internet Society (ISOC) 4, Rue Des Falaises CH-1205 Geneva, SW, pp. 1-33, XP015090269.

Communication Purusant to Article 94(3) EPC, Application No. 18 200 206.3-1213, dated Nov. 22, 2019, European Patent Office, Munich, Germany.

* cited by examiner

METHODS AND APPARATUSES FOR ROUTING DATA PACKETS IN A NETWORK TOPOLOGY

TECHNICAL FIELD

The present disclosure relates to the field of data communications, and in particular to methods and apparatuses in the form of routers for routing data packets in a network topology using an improved routing protocol that is based on zone identities and interface identities.

BACKGROUND

There exist hundreds of different network protocols created for supporting communication between computers and other types of electronic devices. Routing protocols are the family of network protocols that enable computer routers to communicate with each other and in turn to intelligently forward traffic between respective networks. In general, a network routing protocol performs functions which include: discovery which means identifying other routers on the network; routing management for keeping track of all possible destinations (for network messages or data packets) along with some data describing the pathway; and path determination for making dynamic decisions for where to send each network message or data packet.

Examples of routing protocols include Interior Gateway Protocol (IGP) and Exterior Gateway Protocol (EGP).

IGP is a routing protocol which is used to find network path information within an autonomous system, for example a system of corporate local area networks. The gateways (hosts with routers) use this protocol for exchanging routing information in-between. The routing information can then be used by the Internet protocol (IP) or other network protocols to specify how to route transmissions (or data packets). Known IGPs are Routing Information protocol (RIP); Interior Gateway Routing Protocol (IGRP), Open Shortest Path First (OSPF) and Intermediate System to Intermediate System (IS-IS). There is also an Enhanced IGRP (EIGRP) which supports classless IP subnets and improves the efficiency of the routing algorithms compared to IGRP.

EGP is a routing protocol which is used to find network path information between different autonomous systems. EGP is commonly used in the Internet to exchange routing table information. The Border Gateway Protocol (BGP) is an example of EGP. BGP detects modifications to routing tables and selectively communicates those changes to other routers over TCP/IP. Internet providers commonly use BGP to join their networks together.

Another way to route packets is by using Multi-Protocol Label Switching (MPLS) which uses labels attached to packets to forward them through the network. The MPLS labels are advertised between routers. The IP packets are prefixed by these labels and forwarding is done on the basis of these labels and not by a destination IP address, which means forwarding of packets is based on lookup of labels rather than a lookup of the IP addresses, hence speeding up the routing procedure. For example, if Router A wishes to send a data packet to Router E, Router A will insert a header in the data packet with a label stack that contains information about the data packet, where it came from, and where it is going. Router A will then send the data packet to Router B, Router B will send the data packet to Router C, Router C will send the data packet to Router D, and Router D will send the data packet to Router E. Each Router strips away past labels and adds new ones in order to keep forwarding the data packet to where it needs to go. Hence, within each router, the incoming label is examined and its next hop is matched with a new label. The old label is replaced with the new label for the packet's next destination, and then the freshly labeled packet is sent to the next router. Each router repeats the process until the packet reaches an egress router.

MPLS is often referred to as the Layer 2.5 in between the Data Link layer (Layer 2) and Network layer (Layer 3) of the seven-layer OSI model (Open Systems Interconnection model) because of where it operates.

There are, however, several problems with current routing protocols. For instance, they require a long list of entries in routing tables, and need to be updated whenever there are changes in the network. Label switching using MPLS achieves faster routing but MPLS needs to be run over another routing protocol for it to work. This means that two protocols need to run in parallel in each router and due to that, the required resources are doubled. Further, in MPLS, each router needs to generate a new label to replace the old label as explained above.

MPLS may also be used with Virtual Private Network (VPN) to allow several sites to interconnect transparently through a service provider's network. An MPLS VPN comprises a customer network and a service provider network. MPLS VPN service provider edge (PE) routers store customer routing information enabling the PE routers to route traffic belonging to respective customers for inter-site traffic. That traffic is delivered to the customer sites via respective customer edge (CE) routers.

In a MPLS VPN implementation, a PE router performs multiple functions. For example, the PE router isolates customer traffic if more than one customer is connected to the PE router. Each customer is, accordingly, assigned an independent routing table. The PE router shares theses routing tables with other deployed PE routers so that customer traffic can flow between customer sites via the service provider's own network or backbone.

A drawback with MPLS VPN is that it requires at least three different routing protocols to run simultaneously inside the service provider's network: (i) IGP routing protocol (e.g., EIGRP or OSPF) to provide internal routing; (ii) MPLS to support label switching used for VPN in each PE router and in each transit router of the SP (with the drawback that each PE and each transit router needs to generate a new label to replace the old one); and (iii) Internal BGP (or iBGP) to support Virtual Route Forwarding (VRF) features when there are many transit routers in-between, use extended community features to support VRF and to enable connectivity between PEs.

Considering the complexity of such MPLS VPN implementations, a continuing challenge for service providers is to efficiently manage their networks on behalf of their customers. There is therefore a need for a new solution for routing packets in a network topology that is easy to implement and to configure and that requires less consumption of resources, achieves fast routing of packets through fast decision making at each router and provides reduction in size of routing tables.

SUMMARY

It is an object of embodiments herein to solve the above problems by providing methods, and apparatuses (router devices) for routing packets in a network topology.

According to an aspect of embodiments herein, there is provided a method performed by a source edge router, for routing data packets in a network topology, the method comprising: receiving a data packet from a source host router connected to a source host, said packet comprising a source IP address of the source host and a destination IP address of a destination host, the data packet being received on an interface of the source edge router identified by a virtual private network identity (VRF-ID); and extracting, from a configuration information on the interface of the source edge router, a zone-identity (zone-ID) assigned to a destination edge router to which a destination host router is associated, wherein the destination host router is connected to the destination host. The method further comprising: including or adding the zone-ID and the VRF-ID at Layer 2.5 of the data packet; and sending the data packet towards the destination edge router having the assigned zone-ID.

According to another aspect of embodiments herein, there is provided a router device acting as source edge router for routing data packets in a network topology. The router comprising a processor and a memory, said memory containing instructions executable by the processor, wherein the source edge router is operative to receive a data packet from a source host router connected to a source host, said packet comprising a source IP address of the source host and a destination IP address of a destination host, the data packet being received on an interface of the source edge router identified by a virtual private network identity (VRF-ID). The source edge router is further operative to extract, from a configuration information on the interface of the source edge router, a zone-identity (zone-ID) assigned to a destination edge router to which a destination host router is associated, wherein the destination host router is connected to the destination host; to include or add the zone-ID and the VRF-ID at Layer 2.5 of the data packet; and to send the data packet towards the destination edge router having the assigned zone-ID.

According to another aspect of embodiments herein, there is provided a method, performed by a destination edge router, for routing data packets in a network topology, the method comprising: receiving a data packet comprising at Layer 2.5 of the data packet a zone-ID assigned to the destination edge router, an interface identity (VRF-ID) identifying the interface on which a source edge router received the data packet from a source host router, and a destination IP address of a destination host; removing the zone-ID and the VRF-ID from the data packet; and sending the data packet to the destination host router, on an interface of the destination edge router identified by the VRF-ID.

According to another aspect of embodiments herein, there is provided a router device acting as destination edge router for routing data packets in a network topology. The router comprising a processor and a memory, said memory containing instructions executable by the processor, wherein the destination edge router is operative to: receive a data packet comprising at Layer 2.5 of the data packet: a zone-ID assigned to the destination edge router, an interface identity (VRF-ID) identifying the interface on which a source edge router received the data packet from a source host router, and a destination IP address of a destination host; remove the zone-ID and the VRF-ID from the data packet; and send the data packet to the destination host router on an interface of the destination edge router identified by the VRF-ID.

Several advantages are achieved by the disclosure which will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

The present disclosure makes use of a method for routing data packets in a network topology. The protocol which is used for the routing is referred herein as ZLSRP which stands for Zone-based Label Switching Routing Protocol. ZLSRP is described in detail in co-pending Swedish patent application SE 1750815-1 filed by the same applicant. Below are some details of ZLSRP.

In general, in ZLSRP, each router of the service provider is assigned at least one zone-ID and a zone name. A router is also provided with a zone table which includes the zone name, the zone-ID and the address of each leaf network that is connected to the router. Each zone table is exchanged between all routers of the service provider in order for each router to have the same entries in zone table. Each router also builds a routing table so that the routers can reach each other. When a data packet is received at the router, the router determines from the zone table, to which destination zone-ID the destination address or the network ID is associated with and adds or includes the determined zone-ID to the data packet at Layer 2.5 of the data packet and, based on its routing table, sends the data packet towards the destination router having the determined zone-ID indicated in the data packet. If a transit router (or next hop router) receives the data packet, this router checks if its assigned zone-ID matches the zone-ID indicated in the received packet and if not, the data packet is forwarded to the next router, etc., until the data packet is received at the destination router which removes the zone-ID from data packet and forwards the data packet to the final destination host.

Figure 1:
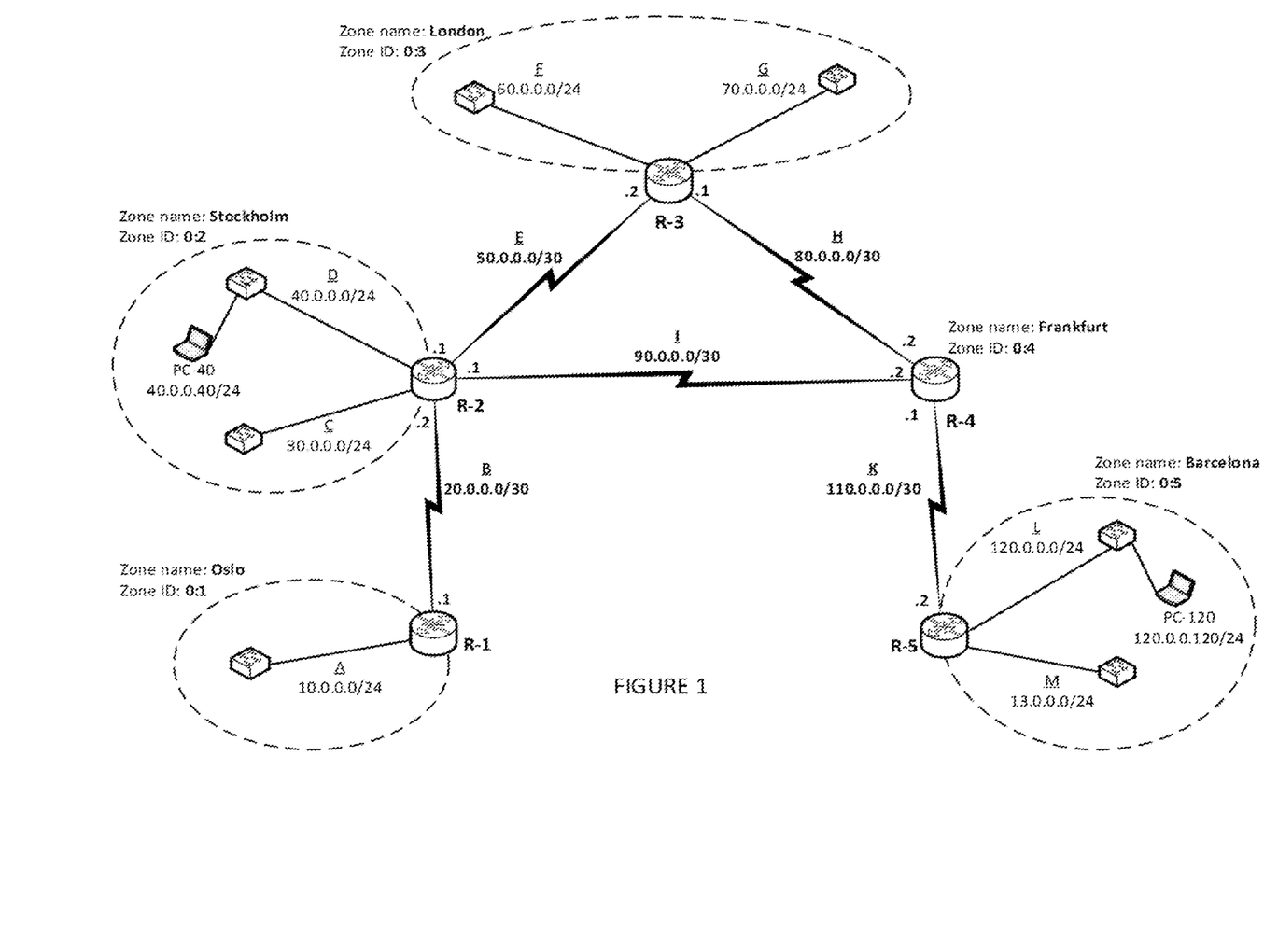
FIG. 1 is an example of a network topology employing ZLSRP.

FIG. 1 illustrates a network topology applying the principles of ZLSRP. As shown, there are five examples of zones named, London, Stockholm, Frankfurt, Oslo and Barcelona. Each zone has at least one (unique) zone-ID. Zone Oslo has zone-ID 0:1; zone Stockholm has zone-ID 0:2, . . . , zone Barcelona has zone-ID 0:5. The zone-ID is assigned to the router dedicated to the zone. For example, zone Oslo has zone-ID 0:1 and the router dedicated to it is router R-1 as shown in the figure. Router R-2 is dedicated to zone Stockholm (zone-ID 0:2), Router R-3 is dedicated to zone London (zone-ID 0:3); Router R-4 is dedicated to zone Frankfurt (zone-ID 0:4) and R-5 is dedicated to zone Barcelona (zone-ID 0:5). A zone may include a leaf network as described below. Note that the network topology may include any number of zones.

Networks A, C and D are three examples of leaf-networks. A leaf network refers to a network that is directly connected to just one router. In the figure, a leaf network is shown including a switch. F, G, K, L and M are also leaf networks. As shown, leaf network A connected to router R-1 within zone Oslo (zone-ID 0:1) has a network address 10.0.0.0/24. Leaf network C within zone Stockholm (zone-ID 0:2) connected to router R-2 has a network address 30.0.0.0/24. Within zone Stockholm, yet another Leaf network is shown connected to the same router R-2 and has address 40.0.0.0/24. To leaf network D is connected a host PC-40 having network address 40.0.0.40/24. However, a zone does not necessarily include leaf networks. Zone Frankfurt (Zone-ID 0:4) is an example of such a zone. Networks B, E, H, I, K are examples of transit networks. A transit network here refers to the interface between two routers. For example, transit network B has network address 20.0.0.0/30 and is the interface network between router R-1 (of zone Oslo) and router R-2 (of zone Stockholm).

As previously described, after exchanging zone tables between all routers, each router has the same zone table (denoted Zone-T). An example of the zone table:

| Zone-T | | |
|---|---|---|
| Zone name | Zone-ID | (Leaf) Networks |
| Oslo | 0:1 | 10.0.0.0/24 |
| Stockholm | 0:2 | 30.0.0.0/24 |
| | | 40.0.0.0/24 |
| London | 0:3 | 60.0.0.0/24 |
| | | 70.0.0.0/24 |
| Frankfurt | 0:4 | N/A |
| Barcelona | 0:5 | 120.0.0.0/24 |
| | | 130.0.0.0/24 |

Below is an example describing how ZLSRP is used to route a packet from PC-40 in zone "Stockholm" (zone-ID 0:2) to PC-120 is zone "Barcelona" (zone-ID 0:5). The routing table of R-2 of zone "Stockholm" is given below:

| R-2: Routing-T (* indicates best route from R-2 to another zone) | | | |
|---|---|---|---|
| Best Route | Zone ID | From/To | Cost |
| * | 0:1 | 20.0.0.1 | 1 |
| * | 0:2 | Directly Connected | 0 |
| * | 0:3 | 50.0.0.2 | 1 |
| | 0:3 | 90.0.0.2 | 2 |
| * | 0:4 | 90.0.0.2 | 1 |
| | 0:4 | 50.0.0.2 | 2 |
| * | 0:5 | 90.0.0.2 | 2 |
| | 0:5 | 50.0.0.2 | 3 |

PC-40 creates or assembles a data packet in order to send it to PC-120. A structure of the data packet is shown below. Note that the structure is simplified. For example, the payload, etc., is not shown.

| L2 | | L3 | | |
|---|---|---|---|---|
| Destination MAC | Source MAC | Source IP | Destination IP | FCS |
| R2 mac | PC-40 mac | 40.0.0.40 | 120.0.0.120 | X |

As depicted, the data packet includes at Layer 2 (L2) the destination Medium Access Control (MAC) address of router R-2. This is because the destination IP address of PC-120 is not local so PC-40 sends the data packet to its configured default gateway or router R-2. The Source MAC address of PC-40 is only indicated at L2. The source IP address at Layer 3 (L3) is the IP address of PC-40. The destination IP address of PC-120 in zone "Barcelona" is also indicated at L3. FCS stands for Frame Check Sequence which may be used for error-detection.

R-2 in zone "Stockholm" receives the data packet from host PC-40 and looks on L3 to see that the destination IP address is 120.0.0.120 (of PC-120) indicated in bold and underlined in the data packet above.

R-2 also determines from the zone table, Zone-T, to which destination zone-ID the destination IP address is associated. Note that from the destination IP address 120.0.0.120 of PC-120 the network ID of the (leaf) network to which PC-120 is connected can be easily determined. In other words, R-2 determines which Zone-ID includes the (leaf) network that is hosting this destination IP address 120.0.0.120. It is zone-ID 0:5, i.e., zone "Barcelona" as shown below (underlined in the table).

| Zone-T | | |
|---|---|---|
| Zone name | Zone-ID | (Leaf) Networks |
| Oslo | 0:1 | 10.0.0.0/24 |
| Stockholm | 0:2 | 30.0.0.0/24 |
| | | 40.0.0.0/24 |
| London | 0:3 | 60.0.0.0/24 |
| | | 70.0.0.0/24 |
| Frankfurt | 0:4 | N/A |
| Barcelona | 0:5 | 120.0.0.0/24 |
| | | 130.0.0.0/24 |

R-2 determines from its routing table (Routing-T) what the next hop is for zone-ID 0:5 and based on Routing-T it is 90.0.0.2 belonging to transit network (I) in FIG. 1.

| R-2: Routing-T (* indicates best route from R-2 to another zone) | | | |
|---|---|---|---|
| Best Route | Zone ID | From/To | Cost |
| * | 0:1 | 20.0.0.1 | 1 |
| * | 0:2 | Directly Connected | 0 |
| * | 0:3 | 50.0.0.2 | 1 |
| | 0:3 | 90.0.0.2 | 2 |
| * | 0:4 | 90.0.0.2 | 1 |
| | 0:4 | 50.0.0.2 | 2 |
| * | 0:5 | 90.0.0.2 | 2 |
| | 0:5 | 50.0.0.2 | 3 |

Now R-2 adds the destination Zone-ID, 0:5, to the data packet at Layer 2.5 (L2.5) as shown below, and R-2 sends the data packet to 90.0.0.2 towards the destination router having the assigned zone-ID 0:5.

| L 2 | | L 2.5 | L 3 | | |
|---|---|---|---|---|---|
| Destination MAC | Source MAC | Destination Zone | Source IP | Destination IP | FCS |
| R-2 mac | R1 mac | 0:5 | 40.0.0.40 | 120.0.0.120 | X' |

In this example, it is router R-4 that receives the data packet via interface (I) 90.0.0.0/30. Router R-4 is here a transit router since PC-120 is not in the zone of R-4. Router R-4 does not look at Layer 3, instead it looks at Layer 2.5 and since R-4 does not see its own zone-ID there, it directly determines from its routing table the next hop router for zone-ID 0:5, which is Router R-5 (see routing table of R-4 below) and sends the packet from its interface ID 110.0.0.1 via transit network K to R-5 interface ID 110.0.0.2.

| R-4: Routing-T (* indicates best route from R-4 of zone 0:4 to another zone) | | | |
|---|---|---|---|
| Best Route | Zone ID | From/To | Cost |
|  | 0:1 | 80.0.0.1 | 3 |
| * | 0:1 | 90.0.0.1 | 2 |
| * | 0:2 | 90.0.0.1 | 1 |
|  | 0:2 | 80.0.0.1 | 2 |
| * | 0:3 | 80.0.0.1 | 1 |
|  | 0:3 | 90.0.0.1 | 2 |
| * | 0:4 | Directly Connected | 0 |
| * | 0:5 | 110.0.0.2 | 1 |

When the destination router R-5 receives the data packet, R-5 determines from the packet at L2.5 that zone-ID is 0:5, i.e., its own zone-ID. R-5 removes from the packet the destination zone-ID 0:5 at L2.5 and determines from L3 the destination address and forwards the packet to PC-120 having destination IP address 120.0.0.120. As network L (120.0.0.0/24) is directly corrected to R-5, the data packet, without L2.5 is forwarded to PC-120. The packet without L 2.5 is shown below.

| L 2 | | L 3 | |
|---|---|---|---|
| Destination MAC | Source MAC | Source IP | Destination IP |
| PC-120 mac | R-5 mac | 40.0.0.40 | 120.0.0.120 |

Now that the principles of ZLSRP have been described, the exemplary embodiments of the present disclosure will be discussed.

Figure 2:
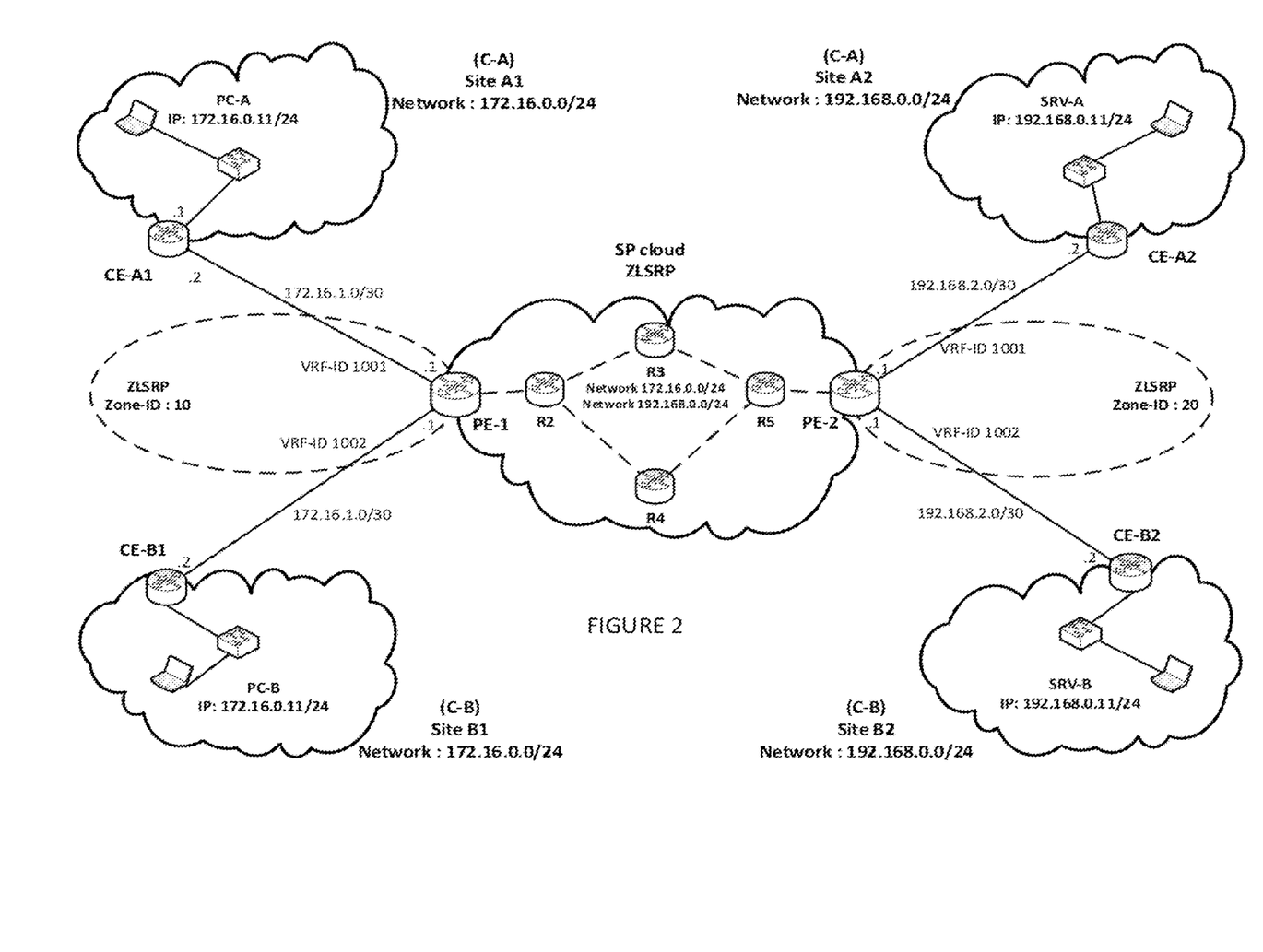
FIG. 2 is an example of a network topology wherein embodiments herein may be employed.

FIG. 2, there is illustrated an example of a network topology wherein embodiments herein may be employed.

It is here assumed that we have two customers: Customer A (C-A) and Customer B (C-B). C-A has two sites (Site A1 and Site A2) and C-B has two sites (Site B1 and Site B2). Each site is connected to a common service provider (SP) or SP cloud.

Each site is identified by a network-ID:
Network-ID of Site A1: 172.16.0.0/24
Network-ID of Site A2: 192.168.0.0/24
Network-ID of Site B1: 172.16.0.0/24
Network-ID of Site B2: 192.168.0.0/24

As shown above, the network address of Site A1 and of Site B1 is the same.

Similarly, the network address of Site A2 and of Site B2 is the same.

This is because the service provider (SP) provides VPNs to C-A and C-B and assigns the same private address range. So different customers use the same IP address range at the same time as long as it is private.

Several routers are also shown in FIG. 2.

PE-1: Edge router of the SP directly connected to customer A in Site A1 and customer B in Site B1.

PE-2: Edge router of the SP directly connected to customer A in Site A2 and customer B in Site B2.

CE-A1: Customer Edge router connected to hosts of Site A1 and to edge router PE-1.

CE-A2: Customer Edge router connected to hosts of Site A2 and to edge router PE-2.

CE-B1: Customer Edge router connected to hosts of Site B1 and to edge router PE-1.

CE-B2: Customer Edge router connected to hosts of Site B2 and to edge router PE-2.

PC-A: Host in Site A1.
SRV-A: Host in Site A2.
PC-B: Host in Site B1.
SRV-B: Host in Site B2.
R2-R5: routers in the cloud or network of the SP.

It should be mentioned that any number of routers can be used and the scenario depicted in FIG. 2 is only an example.

FIG. 2 also shows a zone which is assigned zone-ID: 10; and another zone which is assigned zone-ID: 20. Router PE-1 is therefore assigned zone-ID: 10; and router PE-2 is assigned zone-ID: 20. Routers of the SP run ZLSRP as previously described. It should be mentioned that any router participating in the ZLSRP-VPN solution according to the present disclosure runs ZLSRP.

The network IDs of each interface and of each client device or host device are also indicated.

According to embodiments herein, the interface ID on each PE router belonging to the same VPN interface is unique on both PE-1 and PE-2 and is the same for Site-A1 and Site A2 on one hand and for Site-B1 and Site-B2 on the other hand. This means that the interface of PE-1 connecting PE-1 and CE-A1 of Site-A1 has the same interface ID as that of the interface of PE-2 connecting PE-2 and CE-A2 of Site A2. In FIG. 2, this interface ID is denoted VRF-ID 1001.

Similarly VRF-ID 1002 is the ID of the interface connecting PE-1 and CE-B1 of Site-B1 and is the same ID as that of interface of PE-2 connecting PE-2 and CE-B2 of Site B2. Below is an example of a configuration information per interface of PE-1 and PE-2 respectively.

| PE-1 |
|---|
| Interface G0/1 |
| VRF-ID 1001 |
| IP address 172.16.1.1/24 |
| Neighbor zone-ID 20 |
| Interface G0/2 |
| VRF-Id 1002 |
| IP address 172.16.1.1/24 |
| Neighbor zone-ID 20 |

| PE-2 |
|---|
| Interface G0/1 |
| VRF-ID 1001 |
| IP address 192.168.2.1/24 |
| Neighbor zone-ID 10 |
| Interface G0/2 |
| VRF-ID 1002 |
| IP address 192.168.2.1/24 |
| Neighbor zone-ID 10 |

As shown, for PE-1, for the interface with VRF-ID 1001, the configuration information includes, in addition to the VRF-ID (1001), the name of the interface, which is G0/1; the IP address of PE-1 on said interface, and the neighbor zone-ID (of PE-2) which is 20.

For the same edge router (PE-1), for the interface with VRF-ID 1002, the configuration information includes, in addition to the VRF-ID (1002), the name of the interface, which is G0/2; the IP address of PE-1 on said interface, and the neighbor zone-ID (of PE-2) which is 20.

For PE-2, for the interface with VRF-ID 1001, the configuration information includes, in addition to the VRF-ID (1001), the name of the interface, which is G0/1; the IP address of PE-2 on said interface, and the neighbor zone-ID (of PE-1) which is 10.

Also, for PE-2, for the interface with VRF-ID 1002, the configuration information includes: VRF-ID (1002), the name of the interface, which is G0/2; the IP address of PE-1 on said interface, and the neighbor zone-ID (of PE-1) which is 10.

The above configuration information may be manually assigned to a respective PE-router.

In the following, an example of applying the principles of the present disclosure in a network topology, such as the one shown in FIG. 2, is presented. It is assumed that PC-A is Site A1 of Customer A (C-A) wants to send a data packet or a data frame to SRV-A in Site A2 of the same Customer A. PC-A has IP address 172.16.0.11 and SRV-A has IP address 192.168.0.11. PC-B in Site B1 of Customer B (C-B) also wants to send a data packet to SRV-B in Site B2 of the same Customer B.

It should be mentioned that the data packets may belong to any type of service that may be used such as transmission of emails, messages, files, etc.

Step 1:

PC-A (source host) creates or assembles a data packet (Packet-A) in order to send it to SRV-A (destination host). A structure of the data packet is shown below. Note that the structure is simplified. For example, the payload, etc., is not shown. The simplified structure of the packet is shown for understanding the teachings of the embodiments of the present disclosure. The IP address of the source host PC-A is 172.16.0.11 and the IP destination address of the destination host SRV-A is 192.168.0.11 are included in the data packet.

| Packet-A | | | |
|---|---|---|---|
| L2 | | L3 | |
| Destination MAC | Source MAC | Source IP of PC-A | Destination IP of SRV-A FCS |
| CE-A1 | PC-A | 172.16.0.11 | 192.168.0.11 X |

PC-B creates or assembles a data packet (Packet-B) in order to send it to SRV-B. A structure of the data packet is shown below.

| Packet-B | | | |
|---|---|---|---|
| L2 | | L3 | |
| Destination MAC | Source MAC | Source IP of PC-B | Destination IP of SRV-B FCS |
| CE-B1 | PC-B | 172.16.0.11 | 192.168.0.11 X |

As shown above, both PC-A and PC-B have the same IP address (172.16.0.11) but PC-A belongs to customer A and PC-B belongs to customer B. Also, both PC-A and PC-B want to send data to hosts in their remote site.

Step 2:

Packet-A reaches the source host router (or customer edge router) CE-A1 that is directly connected to PC-A, and Packet-B reaches the source host router CE-B1 that is directly connected to PC-B.

CE-A1 receives Packet-A and sends it to the source edge router PE-1 of the SP.

For simplicity the following static route (syntax) on CE-A1 that sends the packet to PE-1 is:

CE-A1:

ip route 192.168.0.0 255.255.255.0 172.16.1.1

The static route is a command and means that a packet having a destination 192.168.0.0/24 should be sent to IP address 172.16.1.1 which is, in this case, the IP address of PE-1. It should be mentioned that a static route is used for simplicity and the embodiments of the present disclosure are not restricted to any particular syntax.

Packet-A is received on the interface of PE-1 (172.16.1.1) identified by the virtual private network identity VRF-ID: 1001.

| Packet A | | | |
|---|---|---|---|
| L2 | | L3 | |
| Destination MAC | Source MAC | Source IP of PC-A | Destination IP of SRV-A FCS |
| PE-1 | CE-A1 | 172.16.0.11 | 192.168.0.11 X |

Similarly, CE-B1 receives Packet-B and sends it to PE-1. The static router (syntax) on CE-B1 is:

ip route 192.168.0.0 255.255.255.0 172.16.1.1

Packet-B is received on interface of PE-1 (172.16.1.1) identified by the virtual private network identity VRF-ID: 1002.

| Packet B | | | |
|---|---|---|---|
| L2 | | L3 | |
| Destination MAC | Source MAC | Source IP of PC-B | Destination IP of SRV-B FCS |
| PE-1 | CE-B1 | 172.16.0.11 | 192.168.0.11 X |

As shown above, only the source MAC addresses and the destination MAC addresses on Layer 2 are updated. The source IP address of the source host and the destination IP address of the destination host are kept unchanged at Layer 3 of each data packet.

Step 3:

When PE-1 receives Packet-A on the interface G0/1 identified by VRD-ID 1001, and because PE-1 uses the ZLSRP protocol, PE-1 extracts from the configuration information on the interface G0/1 previously shown, the neighbor zone-ID, which is 20 and adds or includes or injects the zone-ID into Packet-A at Layer 2.5. It should be mentioned that, extracting the zone-ID means that PE-1 reads or finds out from the configuration information the zone-ID and then adds this zone-ID to the data packet at Layer 2.5. Hence, extraction of the zone-ID does not mean deleting the zone-ID from the configuration information.

| Packet-A | | | | | |
|---|---|---|---|---|---|
| L 2 | | L 2.5 | L 3 | | |
| Destination MAC | Source MAC | Destination Zone ID | Source IP of PC-A | Destination IP of SRV-A | FCS |
| R2 | PE-1 | 20 | 172.16.0.11 | 192.168.0.11 | X |

Similarly PE-1 extracts from the configuration information on the interface named G0/2 (having VRF-ID 1002), the neighbor zone-ID, which is 20 and adds this to Packet-B at Layer 2.5.

| Packet-B | | | | | |
|---|---|---|---|---|---|
| L 2 | | L 2.5 | L 3 | | |
| Destination MAC | Source MAC | Destination Zone ID | Source IP of PC-B | Destination IP of SRV-B | FCS |
| R2 | PE-1 | 20 | 172.16.0.11 | 192.168.0.11 | X |

As shown above, Packet-A and Packet B include the same information.

PE-1 needs to know to which router each data packet is to be sent. Since PE-1 uses the ZLSRP routing table, PE-1 determines from its routing table whether there is at least a next-hop router to which the data packet is to be sent before reaching the destination edge router. In our example, the ZLSRP routing table of PE-1 shows that the next hop router to reach the destination edge router having zone-ID 20, is R2.

This is shown in Packet-A and Packet-B above, that the destination MAC is of R2.

According to embodiments herein and in order to differentiate between the two packets, PE-1 further adds or includes the VRF-ID of the interface via which the data packet is received. The VRF-ID is also added at Layer 2.5 of the respective packet, i.e., PE-1 performs a double tagging operation.

So for Packet-A received from CE-A1 on interface G0/1 and based on the configuration under that interface (presented earlier), PE-1 adds VRF-ID 1001 at Layer 2.5 of Packet-A, e.g., after the zone-ID 20.

For Packet-B received from CE-B1 on interface G0/2 and based on the configuration under that interface, PE-1 adds VRF-ID 1002 at Layer 2.5 of Packet-B.

The format of Packet-A and the format of Packet-B ready to be transmitted by the source edge router PE-1 towards the destination edge router PE-2, after the double tagging operation, are shown below:

| Packet-A | | | | | | |
|---|---|---|---|---|---|---|
| L 2 | | L 2.5 | | L 3 | | |
| Destination MAC | Source MAC | Destination Zone ID | Destination VRF ID | Source IP of PC-A | Destination IP of SRV-A | FCS |
| R2 | PE-1 | 20 | 1001 | 172.16.0.11 | 192.168.0.11 | X |

| Packet-B | | | | | | |
|---|---|---|---|---|---|---|
| L 2 | | L 2.5 | | L 3 | | |
| Destination MAC | Source MAC | Destination Zone ID | Destination VRF ID | Source IP of PC-B | Destination IP of SRV-B | FCS |
| R2 | PE-1 | 20 | 1002 | 172.16.0.11 | 192.168.0.11 | X |

When Packet-A and Packet-B leave PE-1, none of the transit routers (or next hop routers) (R2, R3, R4 or R5) looks at Layer 3 of the data packets. Instead, a transit router runs the ZLSRP protocol and therefore only needs to look at Layer 2.5 of the received packet(s) to determine whether the zone ID of the received packet matches the zone ID assigned to the transit router. If there is no match, the transit router determines from its routing table the address of the subsequent next hop router and sends the packet. This is performed until the data packet reaches the destination edge router PE-2 whose zone ID matches the zone-ID included in the data packet. It should be noted that none of the transit routers need to look at the VRF-ID indicated in the data packet. They just look at the first label, i.e., the zone-ID since these transit routers apply the ZLSRP process for routing packets.

When the destination edge router PE-2 receives the data packet(s), it looks at Layer 2.5, and because this destination edge router sees its own zone-ID (20) at Layer 2.5 of the received packet, PE-2 looks at the second label (i.e., VRF-ID) to determine which VRF interface connects PE-2 with the destination host router and removes the zone ID and the VRF-ID from the data packet and forwards the data packet to the destination host router.

Hence, when PE-2 receives Packet-A, it determines that CE-A2 is connected to the interface with VRF-ID 1001 indicated in Packet-A. PE-2 removes the zone-ID 20 and the VRF-ID 1001 from Packet-A and forwards the data packet to CE-A2.

Similarly, when PE-2 receives Packet-B, it determines that CE-B2 is connected to the interface with VRF-ID 1002 indicated in Packet-B. PE-2 removes the zone-ID and the VRF-ID and forwards the data packet to CE-B2.

The static route (syntax) for the forwarding of Packet-A respectively Packet-B from router PE-2 are exemplified below:

PE-2:

(For Packet-A):

ip route vrf 1001 192.168.0.0 255.255.255.0 192.168.2.2

(For Packet-B):

ip route vrf 1002 192.168.0.0 255.255.255.0 192.168.2.2

PE-2 forwards Packet-A to CE-A2 on interface G0/1 with VRF-ID 1001 and forwards Packet-B to CE-B2 on interface G0/2 with VRF-ID 1002. The IP address of the interface on CE-A2 and the IP address of the interface on CE-B2 are the same, i.e., 192.168.2.2. But since the VRF-IDs are different, each data packet reaches the correct site.

The format of Packet-A that reaches CE-A2 and the format of Packet-B that reaches CE-B 2 without zone-IDs and VRF-IDs are shown below.

| Packet-A | | | |
|---|---|---|---|
| | | L3 | |
| L 2 | | Source IP | Destination |
| Destination MAC | Source MAC | of PC-A | IP of SRV-A |
| CE-A2 | PE-2 | 172.16.0.11 | 192.168.0.11 |

| Packet-B | | | |
|---|---|---|---|
| | | L3 | |
| L 2 | | Source IP | Destination |
| Destination MAC | Source MAC | of PC-B | IP of SRV-B |
| CE-B2 | PE-2 | 172.16.0.11 | 192.168.0.11 |

Now Packet-A is in Site A2 and Packet-B is in Site B2. Destination host router CE-A2 receives Packet-A and transmits it to the destination host SRV-A having IP destination address 192.168.0.11; and destination host router CE-B2 receives Packet-B and transmits it to the destination host SRV-B having IP address 192.168.0.11.

The format of Packet-A and the format of packet-B that leave CE-A2 and CE-B2 respectively are shown below:

| Packet-A | | | |
|---|---|---|---|
| | | L3 | |
| L 2 | | Source IP | Destination |
| Destination MAC | Source MAC | of PC-A | IP of SRV-A |
| SRV-A | CE-A2 | 172.16.0.11 | 192.168.0.11 |

| Packet-B | | | |
|---|---|---|---|
| | | L3 | |
| L 2 | | Source IP | Destination |
| Destination MAC | Source MAC | of PC-B | IP of SRV-B |
| SRV-B | CE-B2 | 172.16.0.11 | 192.168.0.11 |

As described above, even though the information in Layer 3 is the same in both data packets when the data packets are initially generated, the data packets still reach the correct recipients thanks to the use of the double tagging solution of the present disclosure which is based on both the zone-ID and the VRF-ID.

Furthermore, by using ZLSRP as the only protocol, ZLSRP-VPN is implemented much easier, faster and more efficiently as compared to using the traditional MPLS-VPN which uses iBGP for the virtual connection between PEs that require additional iBGP features to support VRF configuration like route distinguisher; route target, route import/export, etc.

But with ZLSRP-VPN and based on the double tagging technique described earlier, there is no need for the iBGP features. This means the configuration is simpler and more efficient. Less CPU/RAM resources are needed at the routers when they only need to handle one protocol, namely ZLSRP, compared to handling three protocols when using MPLS VPN as previously described.

Yet another advantage of embodiments herein is that unlike MPLS VPN, there is no need to generate separate label(s) in each router. In other words there is no need to replace the zone-IDs for each data packet passing a router, and also there is no need for each transit router to recalculate the FCS field in the packet and update it as in the case in MPLS VPN.

Figure 3:
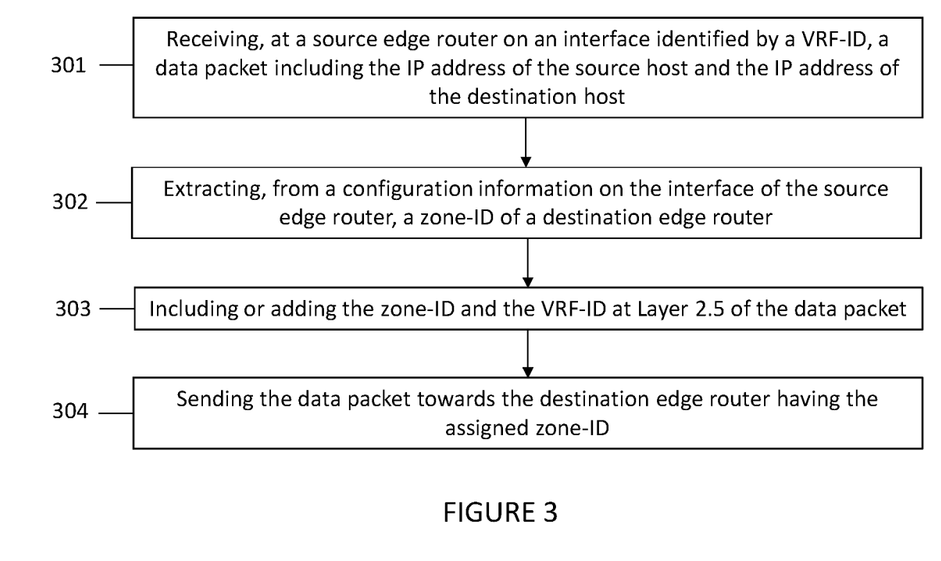
FIG. 3 illustrates a flowchart of a method according to embodiments of the present disclosure including the method performed by the source edge router.

Referring to FIG. 3, there is a flowchart of a method for routing data packets in a network topology according to previously described embodiments.

As shown, the method steps, which are performed by a source edge router, comprise:

(301) receiving, at the source edge router (e.g., PE-1), a data packet from a source host router (e.g., CE-A1), said packet comprising a source IP address of the source host (e.g., PC-A) and a destination IP address of a destination host (e.g., SRV-A), the data being received on an interface (e.g., Int G0/1) of the source edge router (PE-1) identified by a virtual private network identity, VRF-ID (e.g., VRF-ID 1001);

(302) extracting from a configuration information on the interface of the source edge router (PE-1), a zone-identity (zone-ID), of a destination edge router (e.g., PE-2) to which a destination host router (e.g., CE-A2) is associated, wherein the destination host router (CE-A2) is connected to the destination host (SRV-A);

(303) including, adding or injecting the zone-ID and the VRF-ID at Layer 2.5 of the data packet; and (304) sending the data packet towards the destination edge router (PE-2) having the assigned zone-ID.

The step (304) of sending the data packet towards the destination edge router (PE-2) includes, determining from a routing table (of PE-1) whether there is at least a next hop router to which the data packet is to be send to before reaching the destination edge router.

In the example of FIG. 2, the ZLSRP routing table of PE-2 tells us that the next hop router is R2. So PE-1 will send the data packet to R2. Subsequently, R2, being configured with the ZLSRP protocol, will check if the zone-ID of the received packet matches the zone-ID assigned to R2. So R2 determines from its routing table the next hop router to which the data packet is to be sent to. This can be either R3 or R4.

Assuming that it is R3 that receives the data packet, R3 will determine from its routing table that the next hop router is R5 and send the data packet to R5. Then R5 will determine from its routing table that the subsequent next hop router to send the packet to the destination edge router PE-2 since the zone-ID of R5 does not match the zone-ID indicated in the data packet. When PE-2 receives the data packet, PE-2 will check the zone-ID at Layer 2.5 of the data packet and since the zone-ID matches the zone-ID of PE-2, PE-2 will remove the zone-ID and the VRF-ID from the data packet and forward the data packet to CE-A2 which is the destination router directly connected to the destination host (SRV-A).

The interface (G0/1) connecting PE-2 and CE-A2 is used for sending the data packet because this interface has VRF-ID 1001 which is equal to the VRF-ID indicated in the data packet received by PE-1.

When the destination host router (CE-A2) receives the data packet without zone-ID and without VRF-ID, it looks at Layer 3 of the data packet and based on the IP destination, it forwards the data packet to the final destination, i.e., to SRV-A. CE-A2 looks at Layer 3 of the data packet because this router does not run ZLSRP and also the data packet does not contain a zone-ID.

Figure 4A:
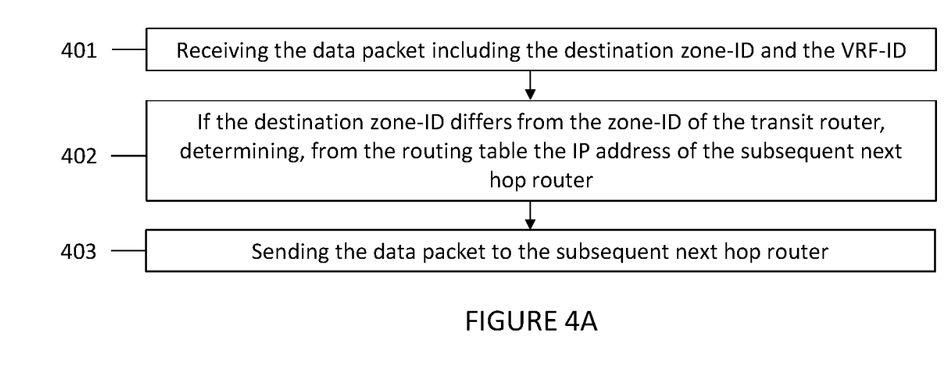
FIG. 4A illustrates a flowchart of a method performed by a transit router or next hop router according to an embodiment herein.

The actions performed by the next hop router (in our example transit router R5) are illustrated in FIG. 4A.

(401) receiving the data packet including the zone-ID and the VRF-ID;

(402) determining from the routing table the IP address of the subsequent next hop router. This is done because the zone-ID of the packet does not match the zone-ID of this router; and (403) sending the data packet to the subsequent next hop router.

Figure 4B:
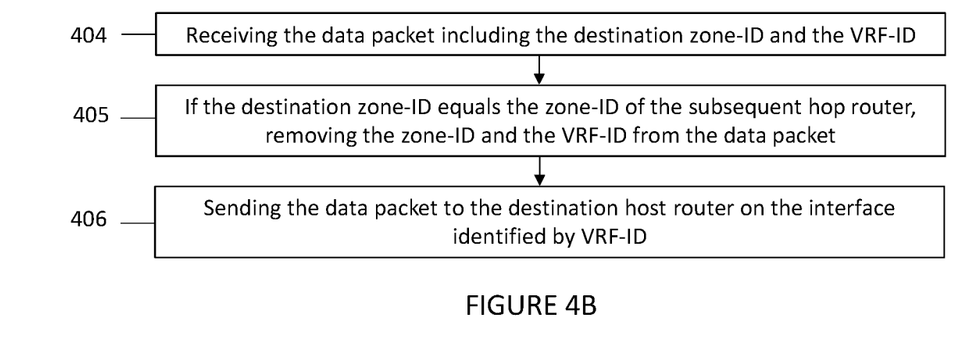
FIG. 4B illustrates a flowchart of a method performed by a destination edge router according to an embodiment herein.

The action performed by the subsequent next hop router (in our example this is destination edge router PE-2) are shown in FIG. 4B.

(404) receiving the data packet, including the zone-ID and the VRF-ID;

(405) removing the zone-ID and the VRF-ID from the data packet. This is performed because this router is the destination edge router of the SP (the zone-ID in the data packet is equal to the zone-ID of this router); and (406) sending the data packet to the destination host router (here CE-A2) on the interface identified by VRF-ID (here 1001).

The same principles are used for the delivery of Packet-B to SRV-B, except that PE-2 sends Packet-B on the interface having VRF-ID 1002 and connecting PE-2 and CE-B2.

Figure 5:
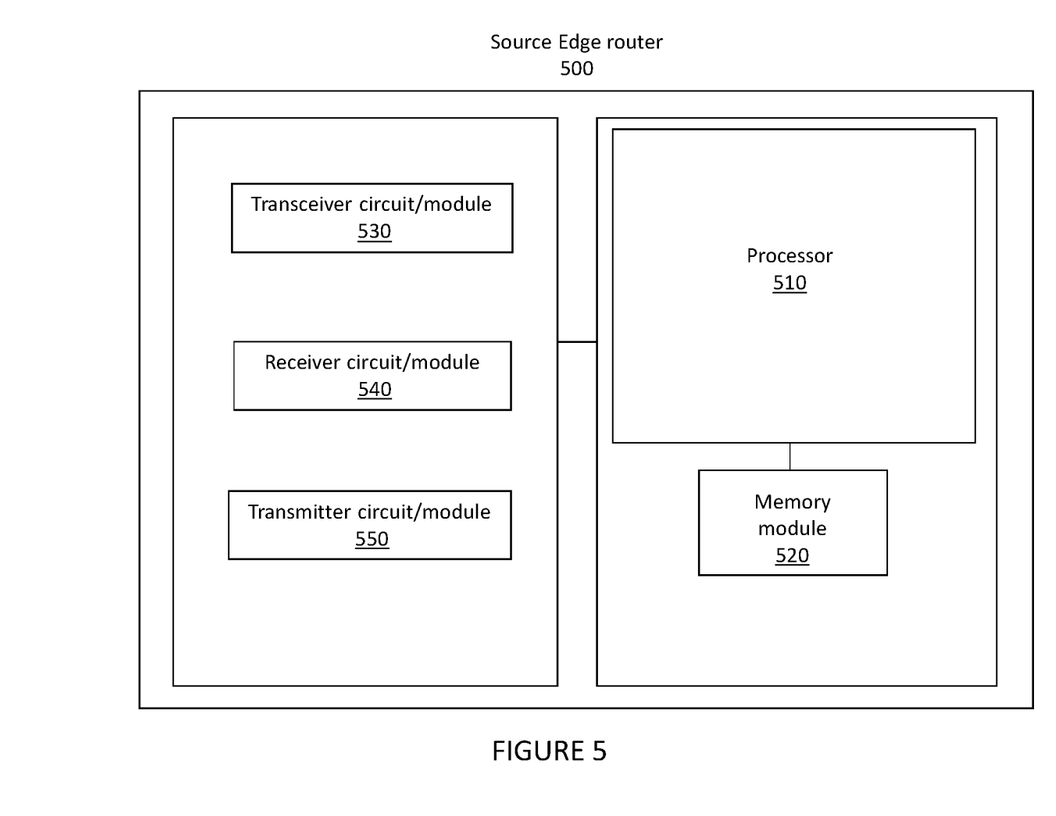
FIG. 5 illustrates an exemplary block diagram of a source edge router according to some embodiments herein.

Referring to FIG. 5, there is depicted a simplified block diagram illustrating a router or routing device 500 acting as the source edge router (e.g., PE-1). The router 500 comprises a processing circuit or a processing module or a processor 510; a memory module 520; a receiver circuit or receiver module 540; a transmitter circuit or transmitter module 550; and a transceiver circuit or transceiver module 530 which may include the transmitter circuit 550 and the receiver circuit 540. The router 500 may be a wireless router or fix router that can be connected through cables to hosts and to other network devices (e.g. other routers). The router 500 may support any radio access technology including 2G, 3G, 4 G, 5G, Wifi, Wimax or a combination thereof.

The processing module/circuit 510 includes a processor, microprocessor, an application specific integrated circuit (ASIC), field programmable gate array (FPGA), or the like, and may be referred to as the "processor 510." The processor 510 controls the operation of the router 500 and its components. Memory (circuit or module) 520 includes a random access memory (RAM), a read only memory (ROM), and/or another type of memory to store data and instructions that may be used by processor 510. In general, it will be understood that the router 500 in one or more embodiments includes fixed or programmed circuitry that is configured to carry out the operations in any of the embodiments disclosed herein.

The processor 510 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 510 to carry out the operations of the router 500 disclosed herein. Further, it will be appreciated that the router 500 may comprise additional components not shown in FIG. 5.

The source edge router 500 is operative to: receive a data packet from a source host router connected to a source host, said packet including a source IP address of the source host and a destination IP address of a destination host, the data packet being received on an interface of the source edge router identified by a VRF-ID. The router is further operative to extract, from a configuration information on said interface, a zone-ID of a destination edge router to which a destination host router is associated, wherein the destination host router is connected to the destination host. The router 500 is further operative to include or add the zone-ID and the VRF-ID at Layer 2.5 of the data packet; and to send the data packet towards the destination edge router having the assigned zone-ID. The router 500 is further operative to determine, from a routing table, whether there is at least a next hop router to which the data packet is to be sent to before reaching the destination edge router, and that being the case, the router is operative to send the data packet to the next hop router.

There is also provided a computer program comprising instructions which when executed on at least one processor 510 of the router 500 according to embodiments herein, cause the at least one processor 510 to carry out the method previously described. Also, a carrier containing the computer program is provided, wherein the carrier is one of a computer readable storage medium; an electronic signal, optical signal or a radio signal.

Figure 6:
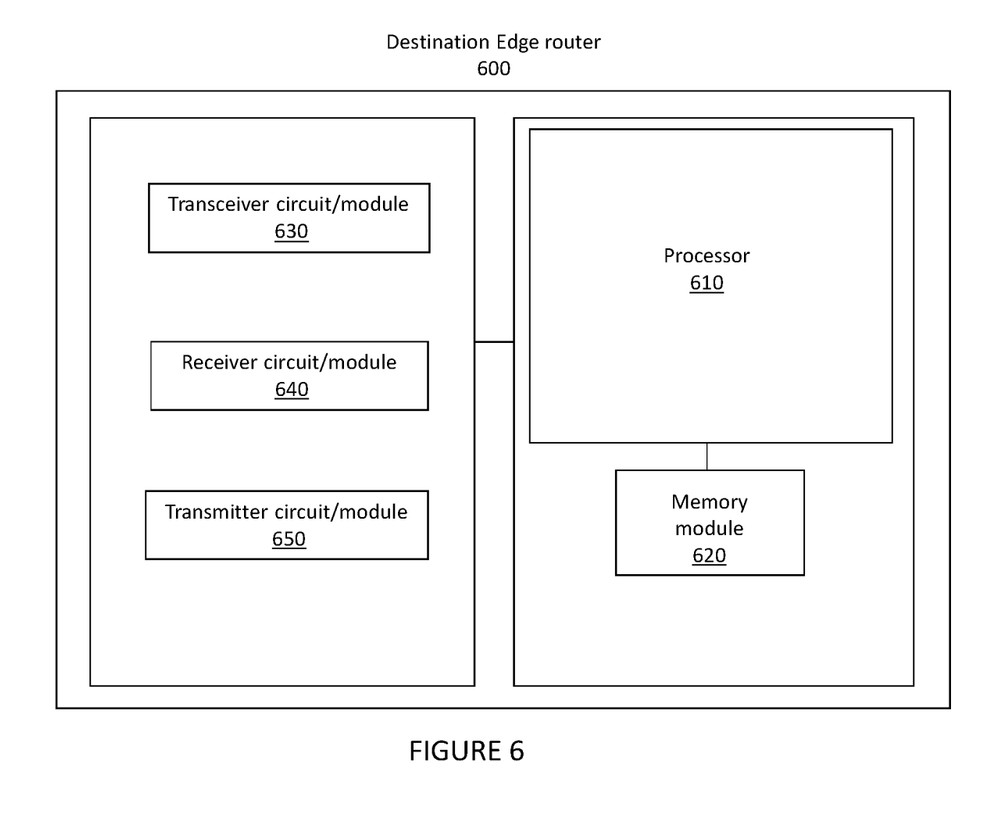
FIG. 6 illustrates an exemplary block diagram of a destination edge router according to some embodiments herein.

Referring to FIG. 6, there is depicted a simplified block diagram illustrating a router or routing device 600 acting as the destination edge router (e.g., PE-2). The router 600 comprises a processing circuit or a processing module or a processor 610; a memory module 620; a receiver circuit or receiver module 640; a transmitter circuit or transmitter module 650; and a transceiver circuit or transceiver module 630 which may include the transmitter circuit 650 and the receiver circuit 640. The router 600 may be a wireless router or fix router that can be connected through cables to hosts and to other network devices (e.g., other routers). The router 600 may support any radio access technology including 2G, 3G, 4 G, 5G, Wifi, Wimax or a combination thereof.

The processing module/circuit 610 includes a processor, microprocessor, an application specific integrated circuit (ASIC), field programmable gate array (FPGA), or the like, and may be referred to as the "processor 610." The processor 610 controls the operation of the router 600 and its components. Memory (circuit or module) 620 includes a random access memory (RAM), a read only memory (ROM), and/or another type of memory to store data and instructions that may be used by processor 610. In general, it will be understood that the router 600 in one or more embodiments includes fixed or programmed circuitry that is configured to carry out the operations in any of the embodiments disclosed herein.

The processor 610 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 610 to carry out the operations of the router 600 disclosed herein. Further, it will be appreciated that the router 600 may comprise additional components not shown in FIG. 6.

The destination edge router 600 is operative to: receive a data packet comprising at Layer 2.5 of the data packet a zone-ID assigned to the destination edge router 600, an interface identity (VRF-ID) identifying the interface on which a source edge router 500 received the data packet from a source host router, and a destination IP address of a destination host.

The router 600 is further operative to remove the zone-ID and the VRF-ID from the data packet; and to send the data packet to the destination host router on an interface of the destination edge router 600 identified by the VRF-ID.

There is also provided a computer program comprising instructions which when executed on at least one processor 610 of the router 600 according to embodiments herein, cause the at least one processor 610 to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for routing of data packets in a network topology, the method comprising:
   receiving, at a source edge router, a data packet from a source host router connected to a source host, said data packet comprising a source IP address of the source host and a destination IP address of a destination host, the data packet being received on an interface of the source edge router identified by a virtual private network identity, VRF-ID;
   extracting, from configuration information on said interface of the source edge router, a zone-identity, zone-ID, assigned to a destination edge router to which a destination host router is associated, the destination edge router located in a zone that is different from a zone of the source edge router, wherein the destination host router is connected to the destination host;
   including or adding the zone-ID and the VRF-ID at Layer 2.5 of the data packet; and
   sending the data packet towards the destination edge router having the assigned zone-ID.

2. The method according to claim 1 wherein sending the data packet includes:
   determining, from a routing table of the source edge router, whether there is at least a next hop router to which the data packet is to be send to before reaching the destination edge router having the zone-ID; and
   if it is determined that there is at least a next hop router to which the data packet is to be sent to before reaching the destination edge router having the zone-ID, sending the data packet to the next hop router.

3. The method according to claim 2 comprising:
   determining, by the next hop router, if the zone-ID in the received data packet differs from a zone-ID assigned to the next hop router;
   if it is determined that the zone-ID in the received data packet differs from a zone-ID assigned to the next hop router,
   determining from a routing table of the next hop router, the address of a subsequent next hop router to which the data packet comprising the zone-ID and the VRF-ID is to be forwarded to; and
   sending the data packet to the subsequent next hop router.

4. The method according to claim 3 further comprising:
   if the subsequent next hop router is the destination edge router,
   removing, by the destination edge router, the zone-ID and the VRF-ID from Layer 2.5 of the data packet; and
   sending the data packet to the destination host router on the interface identified by the VRF-ID.

5. The method according to claim 1, wherein the method is performed by a source edge router.

6. A source edge router for routing data packets in a network topology, the source edge router comprising a processor and a memory, said memory containing instructions executable by the processor, wherein the source edge router is operative to:
   receive a data packet from a source host router connected to a source host, said packet including a source IP address of the source host and a destination IP address of a destination host, the data packet being received on an interface of the source edge router identified by a virtual private network identity, VRF-ID;
   extract, from a configuration information on said interface of the source edge router, a zone-identity, zone-ID, assigned to a destination edge router to which a destination host router is associated, the destination edge router located in a zone that is different from a zone of the source edge router, wherein the destination host router is connected to the destination host;
   include or add the zone-ID and the VRF-ID at Layer 2.5 of the data packet; and
   send the data packet towards the destination edge router having the assigned zone-ID.

7. A destination edge router for routing data packets in a network topology, the destination edge router comprising a processor and a memory, said memory containing instructions executable by the processor, wherein the destination edge router is operative to:
   receive a data packet comprising at Layer 2.5 of the data packet, a zone-identity, zone-ID, assigned to the destination edge router, the zone-ID extracted from configuration information on an interface of the source edge router, an interface identity, VRF-ID, identifying the interface on which a source edge router received the data packet from a source host router, and a destination IP address of a destination host;
   remove the zone-ID and the VRF-ID from the data packet; and
   send the data packet to the destination host router, on an interface of the destination edge router identified by the VRF-ID, the destination edge router located in a zone that is different from a zone of the source edge router.

8. A method performed by a destination edge router for routing data packets in a network topology, the method comprising:
   receiving a data packet comprising, at Layer 2.5 of the data packet, a zone-identity, zone-ID, assigned to the destination edge router, the zone-ID extracted from configuration information on an interface of the source edge router, an interface identity, VRF-ID, identifying the interface on which a source edge router received the data packet from a source host router, and a destination IP address of a destination host;
   removing the zone-ID and the VRF-ID from the data packet; and
   sending the data packet to the destination host router, on an interface of the destination edge router identified by the VRF-ID, the destination edge router located in a zone that is different from a zone of the source edge router.

* * * * *